United States Patent [19]

Burke et al.

[11] Patent Number: 4,689,049
[45] Date of Patent: Aug. 25, 1987

[54] PIGMENT PRINT PASTE WITH IMPROVED ADHESION CHARACTERISTICS

[75] Inventors: Eugene Burke, West Paterson; Jack D. Wocher, Waldwick, both of N.J.

[73] Assignee: Spectrachem Corporation, Paterson, N.J.

[21] Appl. No.: 757,972

[22] Filed: Jul. 23, 1985

[51] Int. Cl.$^4$ .............. C08K 5/54; D06P 1/00; D06P 1/44; D06P 1/50
[52] U.S. Cl. .................................. 8/552; 8/557; 8/558; 8/562; 8/591; 524/43; 524/267; 524/268; 524/501
[58] Field of Search .............. 8/552, 591, 557, 558, 8/562; 524/43, 267, 268, 501

[56] References Cited

U.S. PATENT DOCUMENTS

| 3,440,263 | 4/1969 | Brennan | 528/15 |
| 3,631,087 | 12/1971 | Lewis et al. | 525/479 |
| 3,700,400 | 10/1972 | Cuthbertson | 8/DIG. 1 |
| 3,709,656 | 1/1973 | Kusuhara | 528/18 |
| 3,804,639 | 4/1974 | Trulsson et al. | 106/14.110 |
| 3,821,003 | 6/1974 | Dittrich et al. | 106/1.120 |
| 3,887,509 | 6/1975 | Bolstad et al. | 524/512 |
| 3,955,988 | 5/1976 | Bosch et al. | 106/38.35 |
| 3,984,200 | 10/1976 | Doesburg | 8/581 |
| 4,101,272 | 7/1978 | Guise et al. | 528/10 |
| 4,125,507 | 11/1978 | Kummins et al. | 523/455 |
| 4,152,273 | 5/1979 | Weiland | 106/287.16 |
| 4,366,001 | 12/1982 | Ona et al. | 106/287.11 |
| 4,378,250 | 3/1983 | Treadway et al. | 106/287.110 |
| 4,388,437 | 6/1983 | Ona | 524/588 |
| 4,409,873 | 9/1977 | Creasey et al. | 83/745 |
| 4,438,169 | 3/1984 | Daniels et al. | 8/495 |
| 4,439,239 | 3/1984 | Greigger et al. | 106/287.16 |
| 4,457,980 | 7/1984 | Daniels et al. | 523/222 |
| 4,459,382 | 7/1984 | Ona et al. | 524/860 |
| 4,507,350 | 3/1985 | Hendrix et al. | 8/495 |
| 4,509,981 | 4/1985 | Sanders, Jr. et al. | 106/3 |

FOREIGN PATENT DOCUMENTS

| 0059578 | 5/1975 | Japan | 8/581 |
| 0095383 | 6/1982 | Japan | 8/581 |
| 0018485 | 2/1983 | Japan | 8/581 |
| 0950836 | 8/1982 | U.S.S.R. | 8/581 |

Primary Examiner—Herbert J. Lilling
Attorney, Agent, or Firm—Stanger, Michaelson and Einschlag

[57] ABSTRACT

A novel pigment print paste for the coloration of textiles includes an additive comprising a diorganopolysiloxane. In particular, the diorganopolysiloxane contains reactive functional substituents which will react with other components of the pigment print paste, such as the binder or the clear diluent. Specifically, polydimethylsiloxane, diorganopolysiloxanes carrying side chains containing an amino, epoxy, or carboxyl functional group are illustrative additives. The diorganopolysiloxane may be terminated with alkoxy or hydroxy radicals. Heating a pigment printed textile results in coreaction, or cross-linking, producing advantageous results such as improved color fastness, improved resistance to crocking and abrasion, improved washability, and good hand properties in the printed area.

14 Claims, No Drawings

PIGMENT PRINT PASTE WITH IMPROVED ADHESION CHARACTERISTICS

BACKGROUND OF THE INVENTION

This invention relates generally to compositions for pigment printing of textiles, and more particularly to an improved pigment print paste.

Fibrous materials, such as yarns, knitted or woven fabrics of natural or synthetic fibers, or other textiles, are generally colored by dying, using a dye, or printing, using a pigment print paste. Dyes interact directly with the fiber, and therefore are retained by the fiber to a higher degree than pigments, which are essentially mechanically bound to the fiber by operation of a binder composition. The ability of a coloring to remain fixed to the fibrous material is known as "color fastness." Although dying is preferable over printing from the standpoint of fastness, dyes, and their associated processes are more expensive than pigments and pigment printing processes.

The crock test is a standard test propounded by the American Association of Textile Chemists and Colorists for measuring color fastness. Crocking is the transfer of color from the surface of a colored fabric to an adjacent area of the same fabric or to another surface principally by rubbing action. A device known as a "crockmeter" mechanically rubs the colored fabric to be tested against a white test sample for a given number of times. The amount of coloration transferred to the white test sample by the rubbing is compared against a standardized scale and rated from 1 to 5, with a rating of 5 corresponding to little or no color transfer. Typically, pigment printed fabrics obtain crock test scores of approximately between 2 and 4. There is therefore a need for a pigment printing system which achieves improved color fastness.

The term "pigment print paste" is used herein to denote a combination of a pigment dispersion and a binder composition, and, in certain techniques, a "clear". A clear is also known as an extender, carrier, or gum. It is a thickened diluent for the pigment dispersion and the binder. The binder is a resinous material that will bond or adhere the pigment to the textile. The binder component, therefore, is very important with respect to imparting color fastness to the pigment printed product. Thus, there is a need for an improved binder composition, or an additive to the binder composition and/or pigment print paste which will impart better color fastness to pigment printed materials, without adversely affecting other desirable properties of the finished material.

Frequently, the binder, or other components, of a pigment print paste will contain additives, such as thickeners, emulsifiers, catalysts, and so forth which improve the quality of the pigment print paste. Additives, such as humectants, softeners, or lubricants, improve the quality of the finished textile. None of the known pigment print paste additives, however, improve the quality of pigment fastness. Pigment fastness is a particular problem with dark colors or tones wherein the pigment comprises a higher proportion of the pigment dispersion, resulting in the deposition of a thicker layer of pigments on the fabric.

It is, therefore, an object of the invention to provide an improved pigment binding composition.

It is another object of the invention to provide an improved binder for dark colors wherein a thick layer of pigments is deposited.

It is a further object of the invention to increase color fastness of pigment printed textiles in a reliable manner.

It is an additional object of the invention to improve color fastness of pigment printed textiles without adversely affecting other properties which are desirable in a finished textile product.

It is still another object of the invention to provide a pigment print composition which, when applied to a textile, exhibits greater resistance to crocking and abrasion.

It is yet an additional object of the invention to provide a pigment print paste which provides to a printed textile good hand characteristics, such as smoothness and softness, in the printed area.

It is additionally an object of the invention to provide a system for producing a pigment printed textile which withstands repeated washings.

It is yet a further object of the invention to provide a pigment print system which affords better print quality.

It is yet another object of the invention to provide an additive that can be readily included into existing pigment print paste compositions such as are currently used in the textile industry, for producing the advantageous results referenced hereinabove.

It is additionally a further object of the invention to provide an improved pigment print paste which can be applied by conventional methods.

SUMMARY OF THE INVENTION

The foregoing and other objects are achieved by this invention which is directed to a composition of matter for use in the formation of pigment print paste; the pigment print paste being of the type which is applied to color a fibrous material. In accordance with the invention, a selectable combination of a pigment dispersion, a clear, and a binder, is joined with an additive which contains a diorganosiloxane compound. The diorganosiloxane compound serves to enhance the strength with which the pigment print paste will adhere to a fibrous material, such as a textile.

Preferably, the diorganopolysiloxane compound compound comprises approximately between 0.1% and 15% of the total weight of the pigment print paste. In certain embodiments, the diorganopolysiloxane compound may be formed of dimethylpolysiloxane. In embodiments of the invention where dimethylpolysiloxane is used as the compound which increases the adhesion between the pigment print paste and the fibrous material, the total pigment print paste may contain approximately between 5% and 8% by weight, of dimethylpolysiloxane.

In accordance with a method aspect of the invention, a fractional part of the pigment print paste is selected for combining with a diorganopolysiloxane compound. The fractional part is formed of at least one of a pigment dispersion, a clear, a latex emulsion, and an additive. Any one or all of such components may be present to form the fractional part at the time that the diorganopolysiloxane is mixed therewith. In usage, the pigment print paste is applied to a fibrous material, illustratively by gravure printing technique, and subjected to heat at a predetermined temperature for a predetermined period of time. The temperature range and the duration of the period that the heat is applied are selected to ensure that the pigment print paste is cured.

DETAILED DESCRIPTION OF THE INVENTION

The novel pigment print paste of the present invention comprises a diorganopolysiloxane, such as dimethylpolysiloxane, which will coreact, or cross-link, with functional groups of other components of the pigment print paste and, perhaps, with active hydrogens on the textile surface. In preferred embodiments, the diorganopolysiloxane may be end-stopped with an alkoxy functional group or a hydroxyl functional group which is hydrolyzable to produce the corresponding silanol, and consequently —Si—O—Si— linkages wherein oxygen is available to coreact with other components. A particularly advantageous example of such a diorganopolysiloxane is a silanol end-stopped polydimethylsiloxane.

Suitable diorganopolysiloxane compounds may be characterized by the general formula:

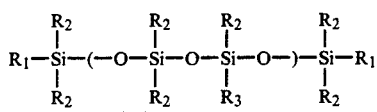

wherein $R_1$ is a lower straight or branched chain alkoxy or hydroxy functional group; $R_2$ is a lower straight or branched chain alkyl functional group; and $R_3$ may be an alkyl functional group such as $R_2$ or it may be a side chain comprising an amino functional group, an epoxy functional group, or a carboxyl functional group.

Illustratively, $R_1$ can comprise a methoxy radical, an ethoxy radical, an acetoxy radical or the like. In alternative embodiments, $R_1$ can comprise a hydroxy radical, thereby forming an end-stopped silanol.

In a preferred embodiment, $R_2$ is a methyl group. In a specific illustrative embodiment, dimethylpolysiloxane of the general formula $(CH_3)_2(SiO)_n$, n being approximately 3000, has been used with advantageous results.

Examples of side chains, $R_3$, which may be attached to the polysiloxane backbone structure in certain embodiments of the invention, include side chains with amino, epoxy, or carboxyl functional groups. Primary and secondary amines, or diamines, such as gamma amino propyl, beta amino ethyl, or dimethylenediamine, are illustrative examples of amino-containing side chains. Specific examples of epoxy functional substituents are cyclohexyl ethyl epoxy radicals, such as 3,4 epoxycyclohexyl-1-ethyl or 2,4 epoxycyclohexyl ethyl radicals. Illustratively, a carboxyl-containing side chain could include a propionic acid radical.

In accordance with the principles of this invention, the selected diorganopolysiloxanes are mixed into the pigment print paste. In a process embodiment of the invention, the additive can be pre-emulsified into any one of the three major components of pigment print paste, or it can be emulsified into the pigment print paste itself.

Pigment print paste consists primarily of three main components in an aqueous-based system. These components are (1) pigment dispersion, (2) clear, and (3) latex emulsion binder. Of course, any one, or all of the three main components may contain additives or auxiliaries for imparting desirable properties to the component per se or to the finished printed textile. Such additives include softeners, thickeners, lubricants, humectants, catalysts, etc., such as are known and commonly used in the art.

It is a particular advantage of this invention that functional groups in the latex binder coreact with functional groups of the additive to form better elastomeric properties following curing, or cross-linking, at an elevated temperature as will be described hereinbelow. The binder component of the pigment print paste may comprise any material that will bond, or adhere, the pigment to the textile fabric. It is typically a latex emulsion polymer which is dispersible in water. The following list, while not all inclusive, constitutes typical commercially procurable latex emulsion polymers commonly used in the textile industry for pigment print paste: styrene butadiene copolymer, carboxylated styrene butadiene, acrylic, acrylic methacrylic copolymer, vinylacetate acrylic copolymer, vinyl chloride, carboxylated butadiene acrylonitrile acrylic terpolymer, and carboxylated butadiene acrylonitrile methyl methacrylate terpolymer. Any such latex emulsions can be utilized in the practice of the invention.

It has been found that the addition of the additive in an amount not exceeding approximately 15% by weight of the total amount of binder/additive results in beneficial pigment adherance to the printed textile. In a preferred embodiment, 5–8% by weight of the additive is included. In a specific illustrative embodiment about 93.5% by weight of carboxylated butadiene acrylonitrile acrylic terpolymer binder latex, on a wet basis (including about 35% by weight dry latex) is combined with about 6.5% by weight of a diorganopolysiloxane, preferably dimethylpolysiloxane.

Emulsification of the additive with the latex binder can be achieved, in some cases, by simple mixing or blending, and in other cases, by the application of a suitable high shear mixing means such as a colloid mill, or by a homogenizer, such as an Eppenbach homogenizer.

The latex binder with the novel additive can then be blended, or emulsified, with the other components of the pigment print paste. In alternative embodiments, the novel additive can be likewise pre-emulsified into the pigment dispersion or the clear.

The pigment dispersion, of course, determines the color of the print paste. Any known organic or inorganic pigment may be used within the scope of th invention. A detailed listing of organic and inorganic pigments can be found in The Encyclopedia of Chemistry, Clark and Hawley, Reinhold Publishing Corp., New York (1966) page 833ff. As specific illustrative examples, iron oxide red or iron oxide black, carbon black, or organic pigments of the azo series can be used with good results. The amount of dry pigment dispersed in an aqueous base may vary widely depending on the color or tone to be achieved, but typically about 1% to 50% dry pigment is included. It is at the high end, where a large amount of pigment is to be bound to the printed textile that the instant invention produces striking results as will be described hereinbelow.

As indicated, the diorganopolysiloxane can be combined initially with any component of the pigment print paste. In embodiments where the additive is pre-emulsified with the pigment dispersion, the overall weight proportion of additive is maintained within the approximate range discussed hereinbelow.

In another highly advantageous embodiment of the invention, the diorganopolysiloxane additive coreacts with functional groups in the clear and can be pre-emulsified with the clear or added to the compounded pigment print paste. The so-called "clear" is a thickened diluent for the pigment print paste. Typically, clear concentrate is sold commercially and is cut to the desired viscosity by the addition of water. The following is a list of commonly used commercially procurable clears for the textile industry: carboxy vinyl polymers, ethylene-maleic anhydride copolymers, carboxylated styrene butadiene copolymers, methyl celluloses, hydroxylated methyl cellulose, and hydroxypropylmethyl cellulose. It should be noted, however, that in certain embodiments of the invention, the clear is omitted from the printing paste formulation. For example, in pad dyeing or spraying applications, the thickened clear is undesirable and pure water is used as a diluent for the printing paste dispersion.

In a complete pigment paste formulation produced in accordance with the invention, the aqueous pigment dispersion comprises, a liquid basis, about 1% to 30% by weight and the binder comprises about 5% to 30% by weight; the balance being clear. In the alternative, if the clear is omitted, the balance comprises water, which in certain embodiments operates or functions as a clear. On a dry basis, about 5% to 50% of the pigment dispersion is pigment solids and 25% to 50% of the binder is latex solids with about 33% being the most typical amount. The balance is water in order to make the formulation on a wet basis.

The novel pigment print paste can be applied to textiles by a variety of known methods in the pigment printing industry, such as gravure printing (roller printing), rotary screen printing, flat bed screen printing (by hand or by machine), pad dyeing, coating with a roller or a knife, or by spraying with an airbrush. Modifications of the pigment print paste to adapt the suitablity for the various methods is well within the skill of one of ordinary skill in the art.

The printing paste of the instant invention has applicability to the pigment printing of all textile fabrics, yarns, and blends, whether woven, non-woven, or knitted, and whether natural, synthetic, or regenerated. Illustrative examples of textiles to which the novel printing paste can be advantageously applied can be cellulose acetate, acrylic, wool, fiberglass, cotton, jute, linen, polyester, polyamide, lastex, vinylidene dinitrile, silk, regenerated cellulose (Rayon), and olefins, such as ethylene or propylene.

Following application of the pigment print paste to a textile by one of the known techniques, the printed textile is then heated to a temperature in the range of 225° F. to 350° F. to permit cross-linking of the polysiloxane additive with functional groups in the binder or thickener, and perhaps with functional groups on the surface of the textile itself. Advantageously, such elevated temperature also drives off the aqueous solvent. The period of exposure to the elevated temperature is process-dependent; however, calculation of the period is within the skill of one of ordinary skill in the art. For gravure printing, an exposure ranging from 1 to 3 minutes has been found to be sufficient to produce the advantageous results of the instacnt invention.

Cloth samples (100% cotton and polyester cotton blends) were printed with a novel pigment print paste containing polydimethylsiloxane additive as described above by a gravure printing method. The cloth samples were tested according to certain standard test procedures outlined in detail in the American Association of Textile Chemists and Colorists (AATCC) Technical Manual, Vol. 60, 1985. In particular, crock transferance was measured with a crockmeter according to AATCC test method 116-1983 on wet and dry bases. Crock test scores of 4 and 5 were recorded for both wet and dry crock. In the prior art, crock scores of 2 to 4 on a scale of 5 were typical. Materials having a crock score of 3 for wet testing and 4 for dry testing were considered acceptable. Crock testing of materials printed with the pigment print paste of the instant invention produced outstanding results. Moreover, the test samples are highly resistant to abrasion.

Cloth samples were also subjected to AATCC test method 61-1980 wash tests #1A, #2A, #3A, and #4A, and passed these tests with good results, thereby indicating superior resistance to the effects of washing.

From a visual standpoint, the samples printed in accordance with the invention have improved print quality with a smoother, more level appearance in the printed area. In addition, the samples also exhibited increased color yield and brightness. Moreover, the sample exhibited good hand qualities. A smoother, softer feel was detected in the printed areas of the textile samples treated with the print paste of the instant invention than with prior art samples.

Although the invention has been described in terms of specific embodiments and applications, persons skilled in the art can, in light of this teaching, generate additional embodiments without exceeding the scope of departing from the spirit of the claimed invention. Accordingly, it is to be understood that the descriptions of this disclosure are proffered to facilitate comprehension of the invention and should not be construed to limit the scope hereof.

What is claimed is:

1. A curable pigment print paste formed by a combination of a pigment dispersion, a clear, a binder, and an additive for improving the strength with which said curable pigment print paste adheres to a fibrous material, said additive being formed at least partially of a diorganopolysiloxane compound whereby said diorganopolysiloxane compound forms approximately between 0.1% and 15%, by weight of said curable pigment print paste.

2. The combination of claim 1 wherein said diorganopolysiloxane compound comprises dimethylpolysiloxane, preferably forming between about 5% and 8% by weight of said curable pigment print paste and.

3. The combination of claim 1 wherein said diorganopolysiloxane compound is molecularly configured to be end-stopped with a selectable one of an alkoxy functional group and an hydroxy functional group.

4. The combination of claim 1 wherein said diorganopolysiloxane compound is molecularly arranged in accordance with the general formula:

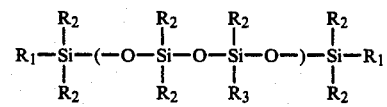

wherein $R_1$ is a lower straight or branched chain alkoxy or hydroxy functional group; $R_2$ is a lower straight or branched chain alkyl functional group; and $R_3$ is selected from the group comprising an amino functional group, and epoxy functional group, a carboxyl functional group, and $R_2$.

5. A composition of matter for forming a curable pigment print paste for printing on a fibrous material, the composition comprising at least one member of a group formed of a clear, a pigment dispersion, and a binder, in combination with a diorganopolysiloxane compound which forms approximately between 0.1% and 15%, by weight of said curable pigment print paste for increasing the retention of the curable pigment print paste by the fibrous material after the curable pigment print paste is cured.

6. The composition of matter of claim 5 wherein said group further comprises an additive for improving a selectable property of the combination of the fibrous material and the curable pigment print paste.

7. The composition of matter of claim 5 wherein said clear is selected from the group consisting of carboxy vinyl polymers, ethylene-maleic anhydride copolymers, carboxylated styrene butadiene copolymers, methyl cellulose, hydroxybutylmethyl cellulose, and hydroxypropylmethyl cellulose.

8. The composition of matter of claim 5 wherein said binder is selected from the group consisting of styrene butadiene copolymer, carboxylated styrene butadiene, acrylic, acrylic methacrylic copolymer, vinylacetate acrylic copolymer, vinyl chloride copolymer, carboxylated butadiene acrylonitrile acrylic terpolymer, and carboxylated butadiene acrylonitrile methyl methacrylate terpolymer.

9. The composition of matter of claim 5 wherein said diorganopolysiloxane compound is molecularly configured to be end-stopped with a selectable one of an alkoxy functional group and an hydroxy functional group.

10. The composition of matter of claim 5 wherein said diorganopolysiloxane compound is dimethylpolysiloxane.

11. A process for forming a curable pigment print paste, the process comprising the steps of:
selecting a fractional part of the curable pigment print paste, said fractional part being formed of at least one of a pigment dispersion, a clear, a latex emulsion, and an additive;
adding a diorganopolysiloxane compound to said selected fractional part for improving an adhesion characteristic of the curable pigment print paste, whereby said diorganopolysiloxane compound forms approximately between 0.1% and 15% of the total weight of the curable pigment print paste; and
mixing said diorganopolysiloxane compound with said fractional part of the pigment print dispersion to form the curable pigment print paste.

12. The process of claim 11 wherein said fractional part contains each of said pigment dispersion, said clear, and said latex emulsion.

13. The process of claim 11 wherein the curable pigment print paste is subjected to the steps of:
applying the curable pigment print paste to a fibrous material; and
curing the curable pigment print paste on the fibrous material to which it is applied by heating to a temperature in the range of approximately between 225° F. and 350° F.

14. The process of claim 13 wherein said diorganopolysiloxane is dimethylpolysiloxane.

* * * * *